US009868138B2

(12) United States Patent
Campagnolle et al.

(10) Patent No.: US 9,868,138 B2
(45) Date of Patent: Jan. 16, 2018

(54) DEVICE FOR SUPPLYING FLAT ITEMS FOR A BUCKET CONVEYOR

(71) Applicant: Solystic, Bagneux (FR)

(72) Inventors: Pierre Campagnolle, Allex (FR); Eric Moullard, Portes les Valence (FR); Patrick Tetaz, Saint Romans (FR); Lionel Fairve, Valence (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 15/126,464

(22) PCT Filed: Feb. 16, 2015

(86) PCT No.: PCT/FR2015/050373
§ 371 (c)(1),
(2) Date: Sep. 15, 2016

(87) PCT Pub. No.: WO2015/145000
PCT Pub. Date: Oct. 1, 2015

(65) Prior Publication Data
US 2017/0087597 A1 Mar. 30, 2017

(30) Foreign Application Priority Data
Mar. 25, 2014 (FR) ...................................... 14 52530

(51) Int. Cl.
*B65G 47/94* (2006.01)
*B07C 3/08* (2006.01)
(Continued)

(52) U.S. Cl.
CPC .................. *B07C 1/04* (2013.01); *B07C 1/00* (2013.01); *B07C 1/06* (2013.01); *B07C 3/087* (2013.01);
(Continued)

(58) Field of Classification Search
CPC ............ B65G 47/967; B65G 2201/022; B65G 17/16; B65G 47/244; B65G 47/38;
(Continued)

(56) References Cited

U.S. PATENT DOCUMENTS 880,091 A * 2/1908 Paton ........................ 198/370.05
4,692,876 A * 9/1987 Tenma ................. B65G 1/1371
414/791.6
(Continued)

FOREIGN PATENT DOCUMENTS

DE 19516666 A1 11/1996
DE 102011087370 A1 5/2013
(Continued)

OTHER PUBLICATIONS

International Search Report dated Jun. 5, 2015 for Application No. PCT/FR2015/050373.

*Primary Examiner* — Mark A Deuble
(74) *Attorney, Agent, or Firm* — Patterson & Sheridan, L.L.P.

(57) ABSTRACT

Feed apparatus for feeding flat articles to a bin carrousel having bins that circulate around a loop in a certain direction comprises a flat conveyor in which the articles are moved in series and as laid flat, and a platform carrousel having tipper platforms each of which is suitable for tilting between a horizontal position and an inclined position and that circulate around a loop in such a manner as to be synchronized with the bin conveyor and in the same direction.

5 Claims, 3 Drawing Sheets

(51) Int. Cl.
*B07C 1/04* (2006.01)
*B65G 47/96* (2006.01)
*B07C 1/00* (2006.01)
*B07C 1/06* (2006.01)
*B65H 29/16* (2006.01)
*B65H 29/36* (2006.01)
*B65G 47/90* (2006.01)
*B65G 47/32* (2006.01)

(52) U.S. Cl.
CPC ........... *B65G 47/967* (2013.01); *B65H 29/16* (2013.01); *B65H 29/36* (2013.01); *B65G 47/32* (2013.01); *B65G 47/90* (2013.01); *B65G 2201/022* (2013.01); *B65H 2701/1916* (2013.01)

(58) Field of Classification Search
CPC .... B07C 1/04; B07C 1/06; B07C 3/02; B07C 3/08; B07C 3/087; B65H 29/16; B65H 29/36; B65H 2701/1916
USPC ..................................................... 198/750.05
See application file for complete search history.

(56) References Cited

U.S. PATENT DOCUMENTS

| | | | | |
|---|---|---|---|---|
| 5,104,105 A | * | 4/1992 | Cote | .......................... B65C 1/02 270/1.02 |
| 5,996,992 A | * | 12/1999 | Raschke | .................. B07C 1/025 198/463.2 |
| 6,595,346 B1 | * | 7/2003 | Advani | .................. B07C 3/082 198/370.04 |
| 6,698,579 B1 | * | 3/2004 | Kerr | ..................... B65G 47/082 198/463.2 |
| 6,762,382 B1 | * | 7/2004 | Danelski | ................... B07C 5/36 198/370.04 |
| 2016/0075516 A1 | * | 3/2016 | Yang | ..................... B65H 31/08 414/800 |

FOREIGN PATENT DOCUMENTS

| | | |
|---|---|---|
| EP | 0101370 A2 | 2/1984 |
| FR | 2708488 A1 | 2/1995 |
| FR | 2864524 A1 | 7/2005 |

* cited by examiner

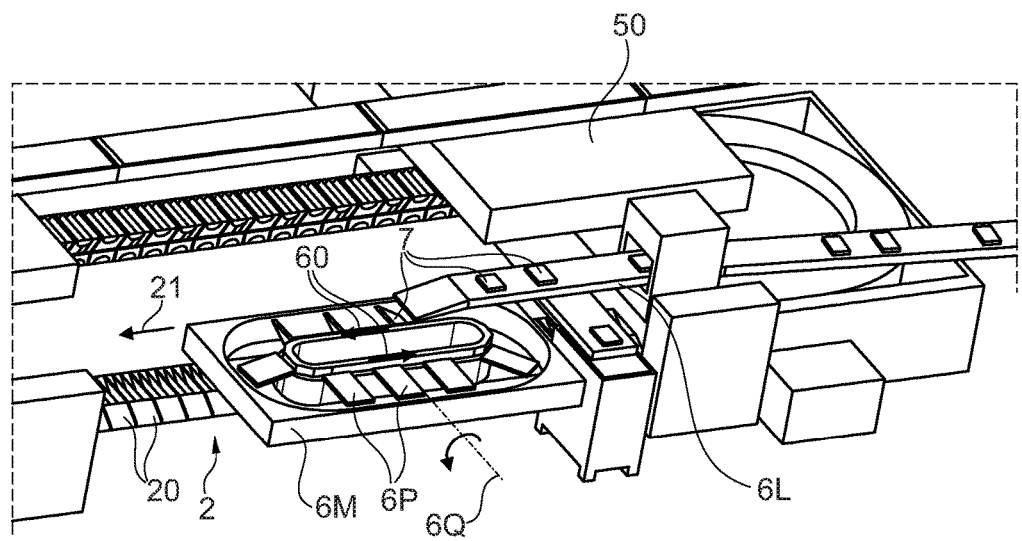
Fig. 4
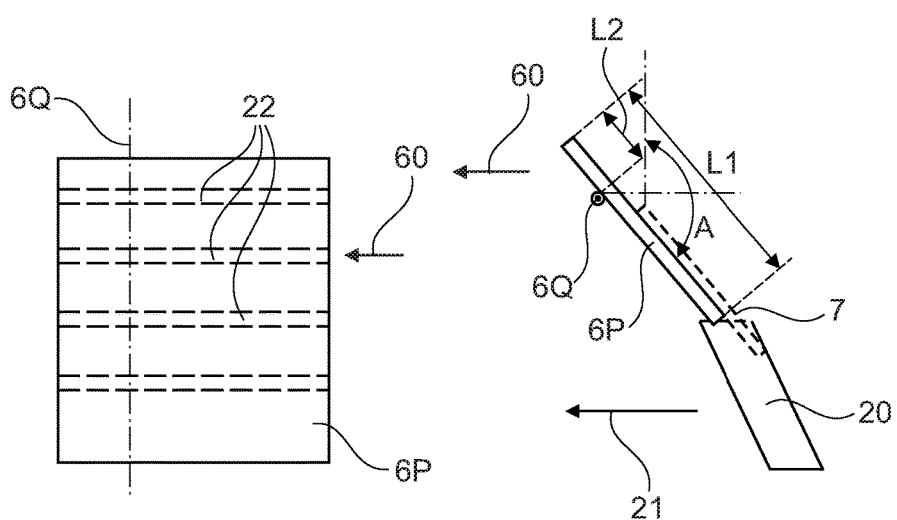
Fig. 5                    Fig. 6

DEVICE FOR SUPPLYING FLAT ITEMS FOR A BUCKET CONVEYOR

TECHNICAL FIELD

The invention relates to flat article feed apparatus for feeding flat articles to a bin carrousel having bins that circulate around a loop in a certain direction.

PRIOR ART

Such flat mailpiece feed apparatus for a bin sorting conveyor in a postal sorting machine is already known, e.g. from Patent Document FR 2 864 524.

In that known postal sorting machine, the mailpieces are machine-sortable mailpieces that are, for example, large-format mailpieces, and each article is injected into a bin on edge via the top of the bin.

In automatic postal sorting, machine-sortable mailpieces may, for example, have lengths lying in the range 140 millimeters (mm) to 380 mm, heights lying in the range 90 mm to 260 mm, and thicknesses lying in range 0.5 mm to 32 mm, with their weights lying in the range 10 grams (g) to 2 kilograms (kg). Such machine-sortable flat mailpieces may have paper envelopes, or they may have wrappers made of plastics material, or indeed they may be in banded bundles.

The range of mail also includes heterogeneous postal articles such as small parcels or packets having very heterogeneous dimensions, weights, and packaging with values that can lie outside the ranges indicated above.

SUMMARY OF THE INVENTION

An object of the invention is thus to propose feed apparatus that is simple and reliable e.g. for feeding parcels or packets to a bin carrousel in a postal sorting machine.

To this end, the invention provides flat article feed apparatus for feeding flat articles to a bin carrousel having bins that circulate around a loop in a certain direction, said apparatus being characterized in that it comprises:
 a flat conveyor in which the articles are moved in series and as laid flat, and a platform carrousel having tipper platforms each of which is suitable for tilting between a horizontal position and an inclined position and that circulate around a loop in such a manner as to be synchronized with the bins of the bin conveyor and in the same direction;
 in that the flat conveyor has a sloping free end that is vertically above the platform carrousel for the purpose of loading the platforms with articles coming from the free end of the flat conveyor when the platforms are in the horizontal position;
 in that each of the tipper platforms has a tilt axis that extends transversely to the loop around which the platforms circulate, the tilt axis of each platform being disposed at the front of the platform in the direction in which the platforms circulate so that, in the inclined position, each platform has a rear side in the circulation direction that is aligned with the inside wall of a bin of the bin carrousel;
 and in that each of the bins of the bin carrousel has a long dimension corresponding to a long dimension of the flat articles that extends transversely to the loop around which the bins circulate so that, in a rectilinear portion along which the platforms circulate on the platform conveyor and which is superposed on a rectilinear portion along which the bins circulate on the bin conveyor, each article loaded on a platform is injected into a bin by gravity and merely by sliding on the platform that is inclined towards the inside of the bin.

In accordance with features of the feed apparatus of the invention:
 the tilt axis of each platform is disposed at a distance relative to the front of the platform in the circulation direction that lies in the range 1/5 of the length of the platform in said circulation direction to 1/3 of said length, and that is preferably equal to 1/4 of the length of the platform;
 each platform has a top face onto which an article is loaded and that is striated; and
 the angular difference between the horizontal position of a platform and the inclined position of said platform is about 60°.

The basic idea of the invention is thus to inject the small parcels or packets via the tops of the bins of the carrousel by causing them to slide by gravity over the tipper platforms of a platform carrousel.

It has been observed that while the platform is tilting into its inclined position in the bin to be loaded, certain mailpieces might tend to lift off the surface of the platform at the time at which they start sliding, due to a difference in relative speeds between the mailpiece and the platform. This lifting-off, which is in general of small amplitude, has no effect on the quality of injection of the articles, although, in certain cases of lifting-off of very large amplitude, it is possible for the mailpiece to hit the downstream wall of the bin and for it not to be injected.

The risks of lifting-off are reduced if the center of gravity of each mailpiece is brought significantly closer to the pivot axis of the tipper platform.

Narrow articles placed at the upper boundary of the platform can be thrown downstream in the event of the platform being damped rapidly, and can then bounce out of the bin.

If the top surface of the platforms is striated or grooved, it is possible to prevent certain mailpieces, in particular those that are wrapped in plastics material, from being slowed down by a suction cup effect as they slide by gravity.

The above-described feed apparatus may be part of an existing postal sorting machine including a bin carrousel having bins that have open tops, and sorting outlets under the bin conveyor.

An embodiment of the flat article feed apparatus of the invention is described below and is shown in the drawings.

BRIEF DESCRIPTION OF THE DRAWINGS

FIG. 4 is a diagrammatic view from another perspective of the downstream portion of the feed branch of FIG. 2 with the bins of a bin conveyor;

FIG. 5 is a diagrammatic view of a tipper platform in an inclined position in which the surface of the platform is parallel to the wall of a bin of the bin carrousel; and FIG. 6 is a diagrammatic view of the striated surface of a platform of the tipper platform conveyor.

DESCRIPTION OF EMBODIMENTS

Figure 1:
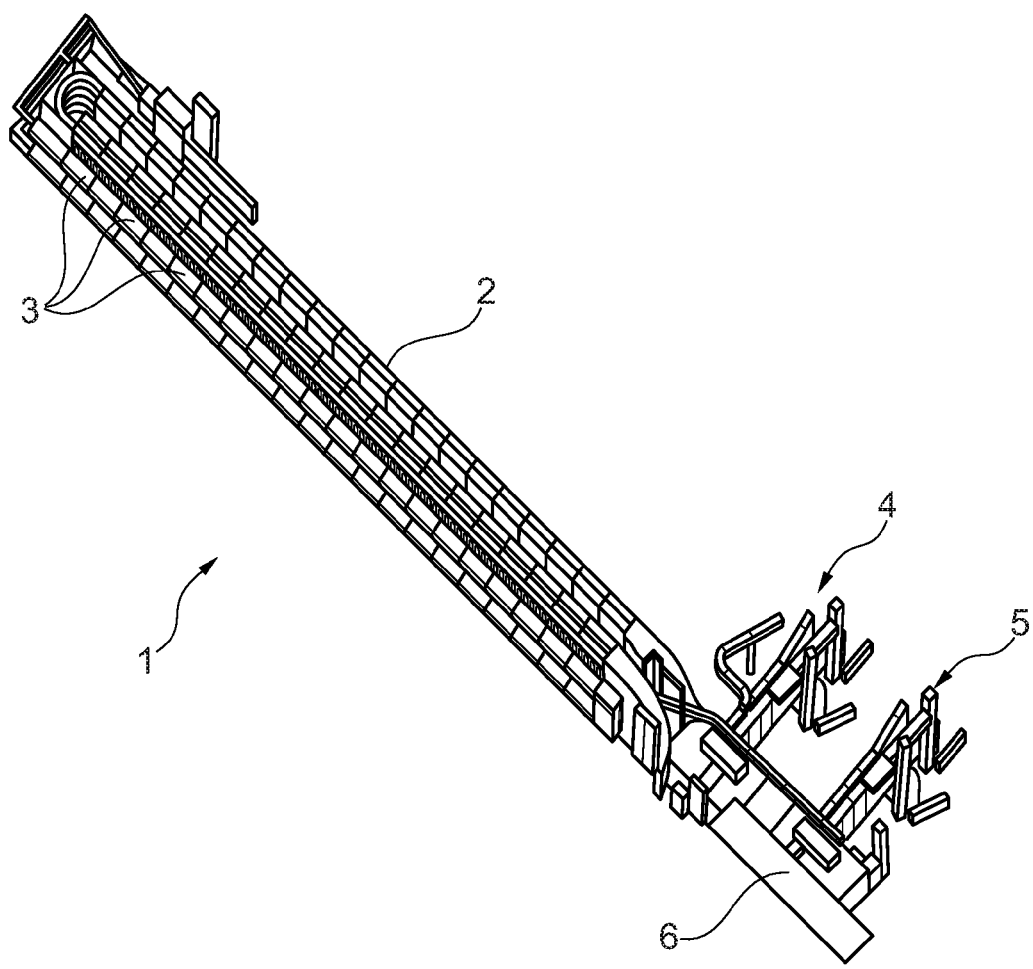
FIG. 1 is a highly diagrammatic perspective view of a postal sorting machine with feed apparatus of the invention for feeding heterogeneous postal articles of the small parcel or packet type to said machine.

FIG. 1 shows a postal sorting machine 1 of the invention seen overall and, in this example, including a sorting conveyor 2 of the bin carrousel type.

The bin carrousel 2 has bins (not shown in FIG. 1 but that can be seen in FIG. 4), each of which is adapted for conveying at least one postal article, which, in this example lying within the ambit of the invention, is a flat mailpiece or a small parcel.

The bins of the carrousel 2 circulate around a closed-loop path above sorting receptacles 3 that, in this example, are removable trays in which the sorted articles may be placed in superposed manner flat.

FIG. 1 diagrammatically shows two feed branches 4, 5 that, in parallel, feed the bin carrousel 2 with homogeneous flat mailpieces of small and/or large format as is known to the person skilled in the art. These flat mailpieces may, for example, be letters, magazines, or the like.

In FIG. 1, reference 6 designates a specific feed branch of the bin carrousel 2, which branch is specifically for heterogeneous postal articles such as small parcels or packets.

The sorting machine 1 is thus suitable for sorting into its sorting outlets 3 a stream of small parcels and a stream of mail, i.e. flat mailpieces, thereby making it possible to optimize postal sorting costs.

Since the packaging and the characteristics of small parcels are different from the packaging and the characteristics of mail, each stream has its own feed branch and its own point of injection into the bin carousel.

Each of the feed branches 4 and 5 conventionally includes: an inlet magazine in which the mailpieces are disposed in a stack and on edge; an unstacker downstream from the magazine, which unstacker unstacks the flat mailpieces and puts them into series; a conveyor having nipping belts for conveying the mailpieces in series and on edge at constant spacing or pitch past a camera; and finally an injector that injects each flat mailpiece vertically into a bin of the carrousel. Each bin thus has an open top through which the mailpiece is injected.

As is known, the camera forms a digital image of the face of each mailpiece that bears a postal address and more particularly the postal address to which the mailpiece is to be delivered, and, on the basis of optical character recognition (OCR) of the delivery address in the image, a control unit of the machine determines the receptacle 3 into which the mailpiece should be put by the bin carrousel.

Figure 2:
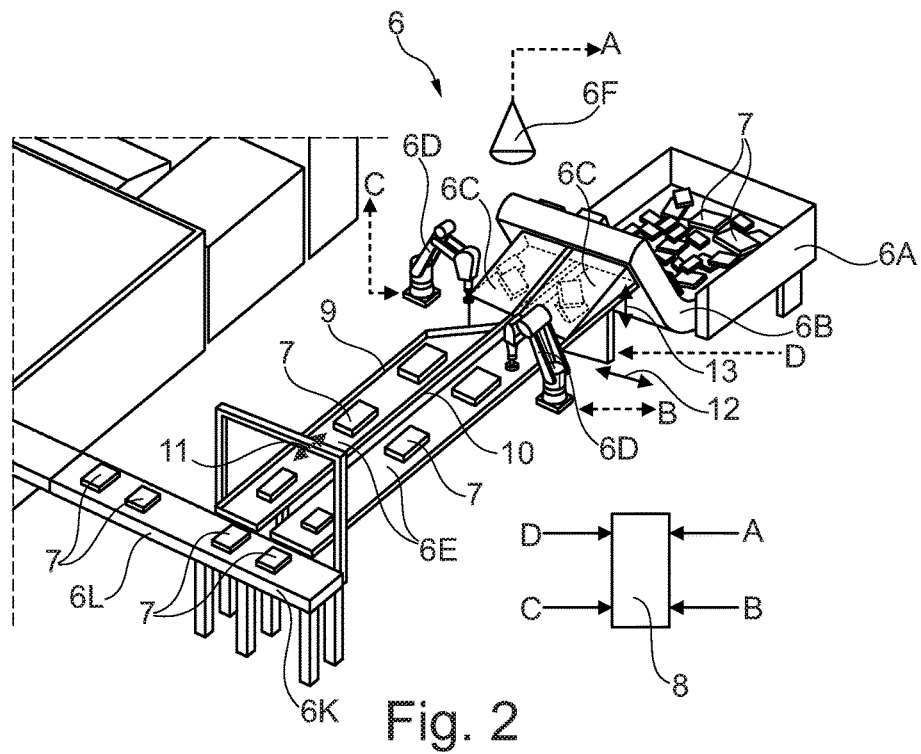
FIG. 2 is a diagrammatic perspective view of an upstream portion of an automatic feed branch for heterogeneous postal articles.

FIG. 2 is a more detailed view of the feed branch 6 that is specifically for heterogeneous postal articles 7 such as small parcels.

It has an inlet that, in this example, is formed by a sort of hopper 6A into which the heterogeneous postal articles 7 are poured in loose manner.

The heterogeneous postal articles 7 in a loose pile in the hopper 6A are separated to some extent mechanically by means of a slatted belt conveyor 6B that forms the floor of the hopper 6A and that transports the postal articles 7 up a slope to vertically above a circular conveyor 6C.

The equipment 6A, 6B, 6C makes it possible to separate the heterogeneous postal articles 7 to an initial extent.

The postal articles 7 that fall onto the circular conveyor 6C are then singulated and put in series by means of at least one robotized handling arm of the "pick and place" type.

In FIG. 2, the feed branch 6 preferably has a first stage of robotized handling arms, namely two robotized arms 6D, 6E in this example, having six degrees of freedom and associated with respective ones of three-dimensional (3D) vision systems 6F, 6G.

The function of this first stage of robotized arms with vision systems is to singulate the heterogeneous postal articles 7 that are still partially piled up on the circular conveyor 6C by picking them up one-by-one and by placing them individually on one end of a flat conveyor 6H.

The circular conveyor 6C recycles the postal objects 7 not picked up by the robotized arms 6D, 6E. Each robotized arm 6D, 6E may be equipped with a suction-cup pneumatic pick-up system.

As shown in FIG. 2, the flat conveyor 6H has two tracks 6H1, 6H2 that are served by respective ones of the robotized arms 6D, 6E that can thus have different pick-and-place rates.

In this example, the feed branch 6 has a second stage of robotized handling arms that are disposed at the other end of the flat conveyor 6H downstream from the arms 6D, 6E, with, in this example, two other robotized arms 6I, 6J associated with a vision system 6K.

In this example, the robotized arms 6I, 6J are robotized arms having four degrees of freedom, with, for example, suction-cup pneumatic pick-ups, for picking the postal articles flat from respective ones of the tracks 6H1, 6H2 and for placing them flat and in series on the floor of another flat conveyor 6L that is adjacent to the conveyor 6H, thereby making it possible to limit the footprint occupied by the postal machine because the conveyor 6L can be in alignment with the sorting outlets 3 of the machine.

In this arrangement of industrial robotized arms mounted at fixed points, the function of singulation is thus separated from the function of putting into series, thereby making it possible to obtain maximum compactness for the feed unit 6, in particular because of the flexibility with which the flat conveyor 6H can be retro-fitted to installations that already exist.

The second stage of robotized arms 6I, 6J may also be adapted to orient the heterogeneous postal articles 7 in the "landscape" orientation, so that their long dimension extends perpendicularly to the longitudinal direction of the flat conveyor 6L. The robotized handling arms of the second stage of robotized arms can then synchronize at constant pitch the heterogeneous postal articles put in series.

Figure 3:
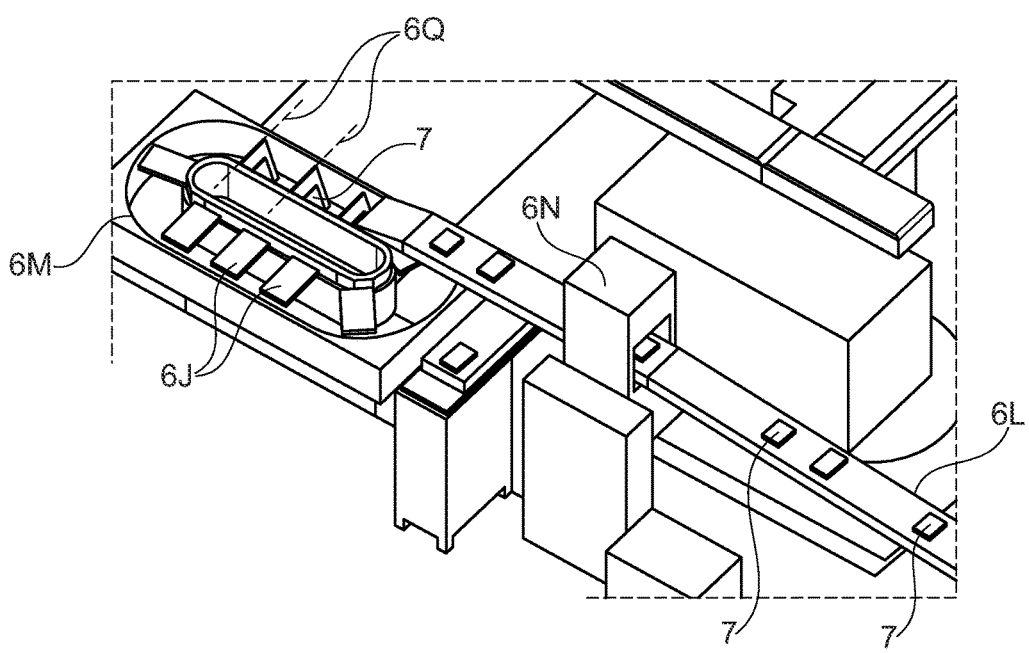
FIG. 3 is a diagrammatic perspective view of a downstream portion of the feed branch of FIG. 2.

FIG. 3 shows the downstream portion of the feed branch 6 of the invention with the flat conveyor 6L that transports the postal articles 7 in series, and flat, towards a tipper-platform carrousel 6M that serves to inject the heterogeneous postal articles 7 into the bins of the bin carrousel 2 via their tops.

As can be seen in FIG. 3, an image-taking system 6N is disposed in the path of the conveyor 6L so as to form two digital images of respective ones of the two opposite sides of each heterogeneous postal article 7. On the basis of the two digital images, the control unit can thus assess, in the image selected, a delivery address for the postal article in question so as to direct said heterogeneous postal article into a corresponding sorting outlet tray.

The tipper-platform carrousel 6M has tipper platforms 6P, each of which is mounted to tilt about a side pivot axis and which circulate over a closed-loop path above the bins of the bin conveyor 2.

Each of the tipper platforms of the carrousel 6M is loaded with a postal article 7. The postal articles 7 arrive one-byone on the platforms of the conveyor 6M via a sloping free end of the flat conveyor 6L, which free end is vertically above the carrousel 6M.

As shown in FIG. 3, each postal article 7 is transferred by tilting a platform towards a bin in which it is stored generally on edge, on its long side. This tilting is effected merely by gravity once the postal article 7 has been loaded on a platform of the carrousel 6M.

FIG. 4 shows that each of the platforms 6P of the tipper-platform carrousel 6M is mounted to tilt about a pivot axis 6Q situated in the vicinity of the front side of the platform. At the end of the tilting movement towards the inclined position, each platform is brought back up automatically into the horizontal position by a ramp system that is situated on the bend of the loop path of the platforms.

The platforms 6P circulate in synchronized manner with the bins 20 of the bin conveyor 2, over the closed-loop path in the direction indicated by the arrows 60 above the bins 20 of the bin conveyor 2. In the example, the closed-loop path of the carrousel 6M has a length of about six meters (m) and the carrousel 6M has eleven platforms 6P that are of rectangular shape, e.g. of size 400 mm by 500 mm, that are moved at the same speed of about 1 meter per second (m/s) as the bins 20 and in the same circulation direction 21 as the circulation direction 21 of the bins.

Each platform of the carrousel 6M is loaded with a heterogeneous postal article 7 that is placed flat on the platform, which is in the horizontal position. The postal articles 7 arrive one-by-one on the platforms of the conveyor 6M via a sloping free end of the flat conveyor 6L, which free end is vertically above the platform conveyor and more particularly vertically above a rectilinear portion along which the platforms of the carrousel 6M circulate.

As shown in FIG. 4, the tilt axis 6Q of each of the platforms of the platform-carrousel extends transversely to the circulation loop of the platforms, and each of the bins 20 of the bin carrousel has a long dimension of about 400 mm (corresponding to the long dimension of the mailpieces) that is oriented transversely to the circulation loop 21 around which the bins circulate.

In the inclined position in which each platform 6P is tilted at an angle A of about 60° relative to the vertical, as shown in FIG. 5, its rear side, in the circulation direction 60, dips into a bin 20 that is also inclined relative to the vertical, and that is moving in the direction 21. The platform is thus aligned with the inside wall of the bin.

In this way, the postal article 7 on the tilted platform 6P is transferred by gravity and merely by sliding into the bin 20 that is moving in the same circulation direction as the platform and in which it is stored substantially on edge on its side that is of the long dimension.

In FIG. 5, it can be seen that the tilt axis 6Q is disposed closer to the front side of the platform than to the rear side of the platform, in the circulation direction 60 in which the platform is circulating. In accordance with the invention and as indicated in FIG. 6, the axis 6Q is disposed at a distance L2 relative to the front of the platform 6P, in the circulation direction 60, that lies in the range 1/5 of the length L1 (about 500 mm in this example) of the platform in said circulation direction to 1/3 of said length L1. Trials have shown that a distance L2 equal to 1/4 of L1 is a good compromise for obtaining the largest range of positions for placement on the platform for articles 7 taken from the entire range of postal mail including homogeneous mailpieces and heterogeneous postal articles.

The top surfaces of the platforms on which the articles 7 are placed have a coefficient of friction that is chosen to increase the range of positions in which the articles 7 can be placed by slightly delaying the time at which the articles slide while the platform 6P is tilting into the inclined position. In addition, as shown in FIG. 6, the top face of each platform 6P has parallel striations 22 that extend in the direction indicated by arrow 60 and that prevent articles 7 wrapped in plastics material from being slowed down under a suction cup effect.

The top face of each platform is thus undulating, thereby enabling air to pass under the article 7 placed on the platform. The ratio of the width of a striation to the width of a trough lies, for example, in the vicinity of 1/10, thereby making it possible to prevent the suction cup effect while offering a sufficient amount of surface area for bearing the article 7.

The length L1 of the platform should enable the article to slide over the platform in such a manner that the bottom edge of the article reaches the bottom of the platform when the platform comes into abutment in the inclined position.

The point at which the heterogeneous postal articles 7 are injected into the carrousel 2 is thus situated at the platform carrousel 6M while the point at which the homogenous flat mailpieces are injected into the carrousel 2 is situated at a different other place, e.g., as in this example, at the end 50 of the feed branch 5.

As appears in FIG. 4, the point of injection at which the heterogeneous postal articles are injected into the bin conveyor 2 is situated more particularly on a rectilinear path portion of the platform conveyor 6M, which portion is above a rectilinear path portion of the bin conveyor 2. At the injection point, the bins 20 circulate in the same direction as the direction in which the platforms 6P circulate.

In FIG. 4, bins 20 are shown that each have three loading compartments that are adjacent to one another in the circulation direction 21. Each compartment may be dimensioned to transport a homogeneous mailpiece or a heterogeneous postal article.

Provision may be made for each bin 20 to have a specific compartment for homogeneous flat mailpieces and a specific compartment for heterogeneous postal articles.

It is also possible to provide bins 20 in which these specific compartments are juxtaposed (disposed side-by-side in the direction perpendicular to the direction 21) without going beyond the ambit of the invention.

By way of example, the synchronization between the platform carrousel 6M of the specific branch 6 may be adjusted relative to the rate of advance of the bin carrousel 2 so as to have one heterogeneous postal article 7 to be injected every six consecutive bins 20 of the carrousel 2.

The invention claimed is:

1. Flat article feed apparatus for feeding flat articles to a bin carrousel having bins that circulate around a loop in a certain direction, said apparatus being characterized in that it comprises:
    a flat conveyor in which the articles are moved in series and as laid flat, and a platform carrousel having tipper platforms each of which is suitable for tilting between a horizontal position and an inclined position and that circulate around a loop in such a manner as to be synchronized with the bins of the bin conveyor and in the same direction, wherein each tipper platform comprises a front side and a rear side;
    in that the flat conveyor has a sloping free end that is vertically above the platform carrousel for the purpose of loading the platforms with articles coming from the free end of the flat conveyor when the platforms are in the horizontal position;

in that each of the tipper platforms has a tilt axis that extends transversely to the loop around which the platforms circulate, the tilt axis of each platform being disposed closer to the front side of the tipper platform than the rear side of the tipper platform, in the direction in which the platforms circulate so that, in the inclined position, each platform has the rear side in the circulation direction that is aligned with the inside wall of a bin of the bin carrousel; and in that each of the bins of the bin carrousel has a long dimension corresponding to a long dimension of the flat articles that extends transversely to the loop around which the bins circulate so that, in a rectilinear portion along which the platforms circulate on the platform conveyor and which is superposed on a rectilinear portion along which the bins circulate on the bin conveyor, each article loaded on a platform is injected into a bin by gravity and merely by sliding on the platform that is inclined towards the inside of the bin.

2. Apparatus according to claim 1, characterized in that the tilt axis of each platform is disposed at a distance relative to the front of the platform in the circulation direction that lies in the range 1/5 of the length of the platform in said circulation direction to 1/3 of said length, and that is preferably equal to 1/4 of the length of the platform.

3. Apparatus according to claim 1, characterized in that each platform has a top face onto which an article is loaded and that is striated.

4. Apparatus according to claim 1, characterized in that the angular difference between the horizontal position of a platform and the inclined position of said platform is about 60°.

5. A postal sorting machine, characterized in that it includes feed apparatus for flat mailpieces according to claim 1, and sorting outlets under the bin conveyor.

* * * * *